Patented June 23, 1936

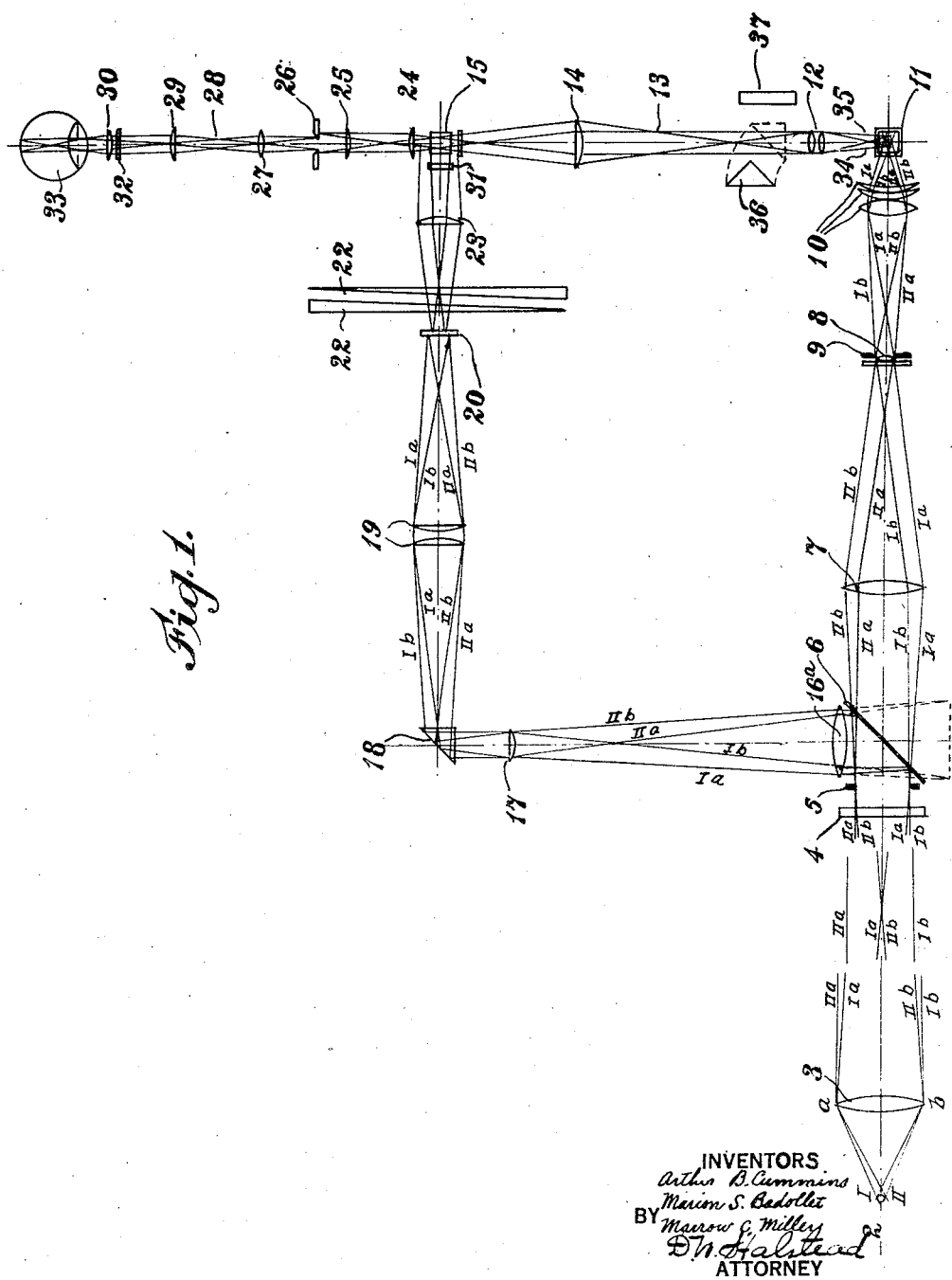

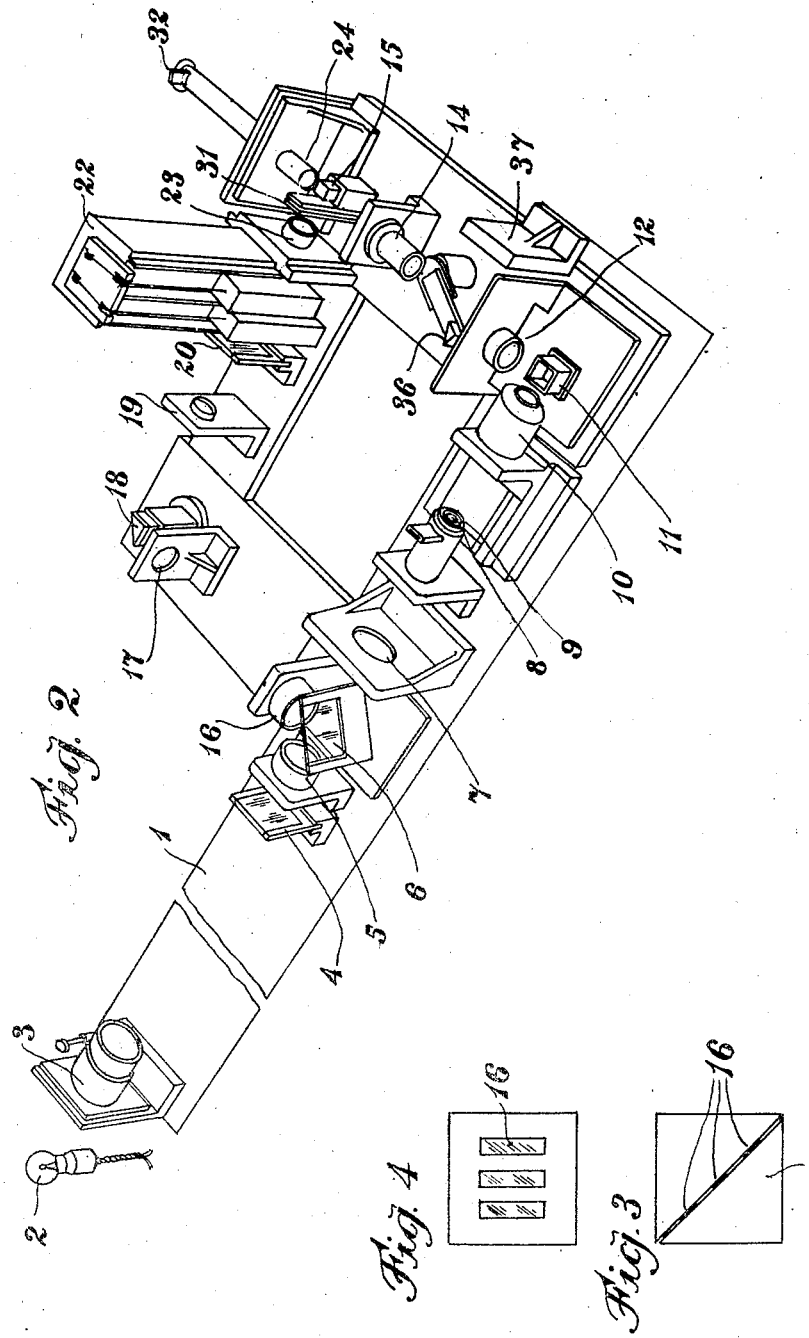

2,045,124

UNITED STATES PATENT OFFICE 2,045,124

APPARATUS FOR MEASURING TURBIDITY

Arthur B. Cummins, Plainfield, Marion S. Badollet, Fanwood, and Morrow C. Miller, Somerville, N. J., assignors to Johns-Manville Corporation, New York, N. Y., a corporation of New York Application September 1, 1933, Serial No. 687,736

3 Claims. (Cl. 88—14)

This invention relates to an apparatus for determining the turbidity of liquids and, particularly, the turbidity of liquids of very low colloid content or liquids so highly colored as to partially mask the turbidity.

The commercial clarification of liquids is important in many industries. In the refining of raw cane sugar, for example, the sugar is made into a solution with water, is mixed with a filter aid, such as comminuted diatomaceous earth, and filtered under pressure. The success of the operation is judged by the closeness of approach to clarity of the filtered liquor. However, there has been heretofore no adequate means of measuring or recording turbidity of the filtrate.

It is an object of the present invention to provide a satisfactory apparatus for measuring and indicating, in comparable units, the turbidity of a liquid medium. Other objects and advantages will appear from the following description and the appended claims.

The apparatus employed are based upon the scattering and reflection of light from a beam incident upon colloidal particles. It has been known previously that, when a beam of light is passed into a liquid containing suspended particles of submicroscopic or colloidal size, light is scattered and reflected to give illumination in all directions generally known as a Tyndall beam. The intensity of this emergent light, other factors being equal, gives a measure of the turbidity produced by the submicroscopic or colloidal properties.

Also, there have been proposed methods and means for measuring the intensity of the emergent beam of light. Difficulties have been encountered, due partly to the weakness or lack of intensity of illumination or lack of uniformity of intensity of the incident beam and due also partly to lack of uniform intensity of cross section of the emergent Tyndall beam.

Briefly stated, the present invention comprises the determination of the turbidity of a liquid medium by a method comprising the formation, in the liquid medium, of a concentrated, that is, very bright image of a uniformly illuminated object and measuring the intensity of the emergent Tyndall beam, suitably by causing the Tyndall beam to illuminate regularly a lens and then imaging the lens in a photometric device. The invention comprises also apparatus adapted for use in measuring turbidity as described and including inter alia the following features: means for introducing into the liquid, the turbidity of which is to be determined, a beam of incident light of small cross sectional area and of uniform and high intensity including means for eliminating from such beam the image of any unevenly illuminated source of light; means for causing the emergent Tyndall beam to illuminate regularly the surface of an object and to focus the image of this illuminated surface upon a photometric comparison element, with the elimination from the element of the image of the Tyndall beam; means for supplying to the comparison element a comparison beam of light of uniform intensity of cross section and of known proportion to the intensity of the said beam of incident light; and means for viewing the comparison element including an eyepiece with diaphragm, means for forming in the diaphragm an image of the Tyndall beam, means of restricting the area of the said image in the diaphragm, means for centering the diaphragm with respect to the Tyndall beam, and means for reimaging the image of the Tyndall beam and diaphragm upon the entrance pupil of the eye of the observer.

While the invention is adapted to be embodied in various manners, an embodiment that is preferred at this time and that has been used with success in determining the turbidity of liquid filtrates is described in connection with the attached drawings in which:

Fig. 1 shows diagrammatically the optical system;

Fig. 2 shows a perspective view of certain parts of an assembly of units that has been used with satisfaction;

Fig. 3 shows a plan view of a photometric comparison element; and

Fig. 4 shows a front view of the comparison element.

The apparatus is suitably mounted upon a casting or support 1 constituting the optical bench to which are secured, by conventional means that are not shown, the supports for the lenses, diaphragms, and other elements.

The source of light is suitably an incandescent electric light 2 having a concentrated filament. Because of the improved optical system that is used, it is not necessary that the lamp should be invariable in the intensity of light emitted. The lamp that is used is suitably of the point source type in which the filament is placed in a relatively small area.

The source of light may be non-uniform in intensity in cross sectional area. If such non-uniform light were focused in the liquid medium, the colloidal turbidity of which is to be determined, there would be uneven illumination of the medium. Therefore, the incident beam system includes means for uniformly illuminating the surface of an object and projecting in greatly reduced size the image of the uniformly illuminated surface in the said medium. The light from the source 2, the two sides of which are designated I and II, respectively, is caused to fall upon lens 3 that is placed at a distance from the source of light that is somewhat greater than the focal length of the lens. The lens is thereby uniformly illuminated and the light passing therethrough is caused to converge, as shown by the lines $a$ and $b$, which, throughout Fig. 1, indicate the course of light rays from the outer edges of the lens 3. These lines are broken, at the left of the lens 3, in order to permit placing the diagram in a smaller space than would be possible otherwise. The lens 3 which receives the illumination from the source of light is suitably a lens of wide aperture that receives a relatively large amount of light from the lamp 2 centered with respect to the lens. The light, after passing through the lens 3, may pass through a clear glass plate 4, to absorb heat rays. The image of the source of light is focused in the diaphragm 5 the opening in which is slightly smaller in area than the image at that position. After passing through the diaphragm, the light strikes the transparent, clear, glass plate 6 disposed, with respect to the direction of the beam of light, at an angle that may be, for example, 45°. A large portion of the light passes through this glass plate, to constitute the incident beam, whereas another, smaller portion is reflected to constitute the comparison beam, as will be described later. It will be obvious also that the glass plate reflects light not only from its front face but also from the inside of its back face, so that light from a given point on the lens 3 will be reflected from the glass plate in two rays. Such light if imaged, in the usual manner, would give two images that are not superimposed, due to the offset between rays reflected from the front face of the glass and the rays from the back thereof. To correct this effect, the glass plate 6 has the front and back faces lying at an angle to each other, the angle being so selected that, when the light from the illuminated lens 3 reflected by the plate 6 is imaged, the images formed by the light from the front and the back faces of the glass plate are superposed.

The beam that is to constitute the incident beam, having passed through the glass plate 6, without reflection, then passes through lens 7 placed at one focal length behind the diaphragm 5. This lens forms an image of lens 3 in the small lens 8, the size of the image in the latter lens being limited by the diaphragm 9 disposed adjacent to the lens. The lens 8 is suitably of small area of cross section and the light thereon is highly concentrated. The lens 8 reduces the area of illumination on the next following lens 10 and thus avoids the optical imperfections in the outer border thereof. Lens 8 also images the image of the light source 2 in the plane of lens 10, thereby preventing the formation of the image of the source 2 in the Tyndall beam to be described later.

The lens 10, for convenience, may be a compound lens. The light is thereby reimaged in the cel 11. This cell is a vessel with transparent glass walls and open top adapted to receive the liquid containing colloidal particles constituting turbidity, the extent of which is to be measured. In this liquid the image of the lens 3 is reimaged in an even more concentrated form, to give a very bright beam of light. This very bright, intense beam of light, striking colloidal particles, results in the emission or emergence of the Tyndall beam, which is suitably viewed at a right angle to the general direction of the incident beam entering the cell 11.

Because the incident beam is uniform in intensity in cross section, the Tyndall beam emitted is also regular, the image of the unevenly illuminated source 2 of light having been eliminated from the incident beam by the optical system described. The emergent beam illuminates regularly but not uniformly the lens 12 which amy be compound. This lens is placed at a distance from the cell that is greater than the focal length of the lens. Light from the Tyndall beam, passing through the lens 12, is converged to form an image of the Tyndall beam at position 13 and then falls upon the lens 14 placed one focal length beyond position 13. The image of the uniformly illuminated lens 12 is formed by lens 14 in the photometric comparison element 15.

The photometric comparison element 15, as illustrated in Figs. 3 and 4, is a Lummer-Brodhun cube of transparent glass formed in two halves enclosing, between them, three opaque strips 16 of plated silver. When the light from the cell is passed into this cube, the light passes through the spaces between the silvered strips, to give illumination except in the areas corresponding to the said three strips.

The comparison beam split from the original beam of light by the reflecting plate 6, as previously described, passes through the lens 16a and forms on lens 17 an image of the uniformly illuminated lens 3. Beyond the lens 17 is disposed a right angle reflecting prism 18 of clear glass which reflects the light to the compound lens 19, upon which is imaged the source of light. The angle between the two faces of the plate 6, being such as to superpose the two images of lens 3 upon lens 17, is not such as to superpose upon lens 19 the two images of the diaphragm 5 containing the image of the source 2 of light. Lens 19 is of diameter large enough to include both images of the diaphragm 5. The uniformly illuminated lens 3 is again imaged in the plane of the ground glass plate 20. The light from every point of the images of the source of light on lens 19 is also spread uniformly over all the illuminated area of the ground glass plate 20, which now becomes a new source of uniform illumination free, from this point on, of any images of the source 2. Beyond the glass plate 20 are disposed the neutral wedges 22. These wedges are of conventional type and mounting and contain light absorbing material of established density. The greater the thickness of wedge in the path of the light beam, other factors being the same, the more light will be absorbed and the less intense will be the light transmitted. From this adjustable light absorption unit, the transmitted light passes to the lens 23.

From lens 23 the comparison beam, after first being passed through a monochromatic filter 31, if desired, enters the photometric comparison element. That portion of the light which strikes the opaque (silvered) areas is reflected and passed into the observation system, side by side, with that portion of the emergent beam that has passed through the spaces between or around the opaque areas.

In the observation system the lenses 24 and 25 form an eyepiece analogous to the eyepiece of a microscope. In this case the lenses are adjusted as a unit to focus the image of the photometric field at infinity, the image of the lens 12 illuminated by the Tyndall beam being formed in the plane of the diaphragm 26.

Beyond the diaphragm there is arranged telescopic means of viewing the image and diaphragm 26, including lens 27, placed one focal length behind the diaphragm 26 and imaging at position 28 the image of the photometric field in element 15, and lenses 29 and 30 constituting together the telescopic eyepiece and disposed as illustrated. With this eyepiece adjusted for infinite focus, the image at position 28 is reimaged on the retina of the eye 33 of the observer and the image of the diaphragm 26 is imaged in the entrance pupil of the eye.

In order that the beams of light being compared may be of the same quality, a monochromatic filter 31 may be placed in the path of the comparison beam, in advance of the photometric comparison element. Preferably the monochromatic filter is placed at position 32 in the telescopic eyepiece above referred to.

The Tyndall beam which is formed in the cell 11 varies regularly in intensity from right to left, the Tyndall beam at position 34 being less intense than at position 35, at the left side of the beam as illustrated in diagram in Fig. 1. The variation between these two extremes is gradual and regular. The result is that the lens 12, while illuminated regularly, is illuminated more intensely in the portion on one of its sides than in the portion on the other. When light from this lens is passed between the silvered surfaces of the photometric cube illustrated in Fig. 4, the light is more intense on one side of the cube than on the other. On the other hand, the comparison beam will be not only regular in its intensity from side to side, but also uniform. It is possible, therefore to match the intensity of the comparison beam with a central portion of the light from the emergent beam, while a portion of the emergent beam at one side of the comparison field is of greater intensity and a portion of the emergent beam at the other side of the field is of lesser intensity than that of the adjacent portions of the comparison beam. While this effect would appear, at first, to be confusing, it is really desirable, in that one can observe, at the moment of matching the light in the central portion of the field, other portions of lesser intensity or greater intensity of the emergent beam, whereby the observation is readily confirmed as to its accuracy.

When it is desired to modify the method and apparatus in order to record photochemically the intensity of the emergent beam, the comparison beam and the observation system described above may be eliminated and the right angle reflecting prism 36 swung into position in the emergent beam, as indicated by the dotted lines in Fig. 1, so that the emergent beam is reflected into a camera and there recorded photographically. The camera is not shown, as it is conventional, but the position of the mount therefor is indicated at 37. When the camera is used, the quantitative effect of the emergent beam upon the photosensitive plate or film, after development, is compared with the effect of an emergent beam produced under standard conditions, say, with the effect of the beam from a liquid medium accepted as a basis for comparison of turbidity.

It is to be understood that elements or parts described may be omitted if their effect is not desired. It is to be understood also that conventional accessories may be used in connection with the optical system, but are omitted from the description hereof for the sake of brevity and clearness.

Thus, there may be used means for shifting the cell 11 with respect to the beam of incident light, so that the intensity of the emergent beam may be measured after passing through different thicknesses of layer of turbid liquid. In this manner it is possible, by extrapolation, to calculate the intensity of the Tyndall beam for the condition in which it passes through a layer of liquid of zero thickness.

The wedges 22 are adjustable, in the path of the comparison beam, by any suitable means. Their position, affecting the thickness of wedge through which the beam of light passes, is read on conventional scales. It will be understood that the second wedge is compensating with respect to the first wedge, the second wedge being arranged with its density gradient reversed to that of the first wedge. The combination of the two wedges, therefore, provides a neutral light filter of uniform density for the comparison beam passing therethrough and, at the same time, provides means of changing the overall density or thickness of the combined filter by moving one or both of the wedges.

For convenience in commercial use and in excluding light from other sources, as well as dust, the optical system described is suitably enclosed in an opaque housing or tubes. The enclosing members are not shown, inasmuch as they are also conventional and not a part of the present invention.

The invention is not limited to any particular dimensions or spacing of the parts. For convenience in judging approximately the spacing of the various elements the following dimensions in a typical apparatus are given: Distance from the lens 3 to cell 15, 1010 mm.; distance from cell 15 to the photometer comparison element, 250 mm.

From these illustrative dimensions, the optical construction lines, and the previous statements describing the functioning of the various parts, suitable spacing of the various elements as well as variations in the dimensions given may be made.

The use of the apparatus may be illustrated in connection with the determination of the turbidity of a filtered aqueous solution of raw cane sugar, in evaluating the thoroughness of the filtration. The cell 11 is nearly filled with the liquid to be examined. The light is then turned on. Adjustment is made of the neutral wedges 22, to proper position in the comparison beam, so that the observer viewing the photometric comparison element or cube 15 will see equal intensities of light in the comparison beam and in the central portion of the light from the emergent Tyndall beam. At this setting of the wedge, there will be visible a contrast in the comparison cube, the portion of the Tyndall light at one side of the field of vision being brighter than the comparison beam at this point and the portion of the Tyndall light at the other side being darker than the comparison beam.

The method and apparatus described make possible the evaluation of minute differences between sugar filtrates in the critical range in which one filtrate, on being crystallized, will give differences in quality of the resulting sugar.

From the setting of the wedge, as indicated by the scale reading, there is shown the percentage of the total light of the comparison beam which is transmitted to the comparison element in matching the intensity of the light from the Tyndall beam. The relative turbidity of various liquids may be compared and recorded by observing and recording the percentage of the total intensity of the comparison beam that is required to match the intensity of light from the Tyndall beam set up in each of the various liquids.

It will be appreciated that, in a split beam system of this kind, fluctuations in the intensity of the light emitted from the source 2 does not introduce an error into the final result, inasmuch as the fluctuation does not change the ratio of the intensity of the incident beam to that of the comparison beam.

The details that have been given are for the purpose of illustration, not restriction, and variations therefrom within the scope of the appended claims may be made without departing from the invention.

What we claim is:

1. An apparatus for measuring the turbidity of a medium comprising in combination means for uniformly illuminating the surface of an object of the type of a lens, means for splitting each ray of light from the effective area of the said surface into two beams of known relative intensities and forming two similar images of the surface of the said object separated in space from each other, means for projecting one of the said images in greatly reduced size as an incident beam into the said medium, means for causing the resulting emergent Tyndall beam to illuminate uniformly the surface of a second object of the type of a lens, means for imaging the surface of the said second object on a portion of a comparison field, means for causing the other of the said images of the first-mentioned object to illuminate a part of the comparison field adjacent to the said portion, and means for comparing the intensities of illumination of the said part and portion of the comparison field.

2. An apparatus for measuring the turbidity of a medium comprising in combination a source of light uniformly illuminating the surface of an object of the type of a lens, means for forming two similar images of the surface of the said object separated in space from each other, means for projecting one of the said images in greatly reduced size as an incident beam into the said medium, means for eliminating from the said medium the image of the source of light, means for causing the resulting emergent Tyndall beam to illuminate uniformly the surface of a second object of the type of a lens, means for imaging the surface of the said second object on a portion of a comparison field, means for causing the other of the said images of the first-mentioned object to illuminate a part of the comparison field adjacent to the said portion, and means for comparing the intensities of illumination of the said part and portion of the comparison field.

3. An apparatus for measuring the turbidity of a medium comprising in combination means for uniformly illuminating the surface of an object of the type of a lens, means for splitting each ray of light from the effective area of the said surface into two beams of known relative intensities and forming two similar images of the surface of the said object separated in space from each other, including a transparent glass plate disposed in the path of the said light and having front and back faces extending in planes forming a small angle therebetween and adapting the front and back faces of the glass plate to superpose, at a selected location, the images of the illuminated lens reflected from the said two faces, means for projecting one of the said images in greatly reduced size as an incident beam into the said medium, means for causing the resulting emergent Tyndall beam to illuminate uniformly the surface of a second object of the type of a lens, means for imaging the surface of the said second object on a portion of a comparison field, means for causing the other of the said images of the first-mentioned object to illuminate a part of the comparison field adjacent to the said portion, and means for comparing the intensities of illumination of the said part and portion of the comparison field.

ARTHUR B. CUMMINS.
MORROW C. MILLER.
MARION S. BADOLLET.